US007320338B2

(12) United States Patent
Cabuz et al.

(10) Patent No.: US 7,320,338 B2

(45) Date of Patent: Jan. 22, 2008

(54) MICROVALVE PACKAGE ASSEMBLY

(75) Inventors: Eugen I. Cabuz, Eden Prairie, MN (US); Jay G. Schwichtenberg, New Hope, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/908,998

(22) Filed: Jun. 3, 2005

(65) Prior Publication Data

US 2006/0272718 A1 Dec. 7, 2006

(51) Int. Cl.
*F16K 11/20* (2006.01)

(52) U.S. Cl. ............... 137/884; 137/454.6; 251/129.01

(58) Field of Classification Search ............. 137/454.6, 137/597, 889; 251/11, 129.01, 315, 315.11, 251/367

See application file for complete search history.

(56) References Cited

U.S. PATENT DOCUMENTS

| | | | |
|---|---|---|---|
| 2,403,692 | A | 7/1946 | Tibbetts |
| 2,975,307 | A | 3/1961 | Shroeder et al. |
| 3,304,446 | A | 2/1967 | Martinek et al. |
| 3,381,623 | A | 5/1968 | Elliot |
| 3,414,010 | A | 12/1968 | Sparrow |
| 3,641,373 | A | 2/1972 | Elkuch |
| 3,769,531 | A | 10/1973 | Elkuch |
| 3,803,424 | A | 4/1974 | Smiley et al. |
| 3,947,644 | A | 3/1976 | Uchikawa |
| 4,115,036 | A | 9/1978 | Paterson |
| 4,140,936 | A | 2/1979 | Bullock |
| 4,197,737 | A | 4/1980 | Pittman |
| 4,418,886 | A | 12/1983 | Holzer |
| 4,453,169 | A | 6/1984 | Martner |
| 4,478,076 | A | 10/1984 | Bohrer |
| 4,478,077 | A | 10/1984 | Boher |
| 4,498,850 | A | 2/1985 | Perlov et al. |
| 4,501,144 | A | 2/1985 | Higashi et al. |
| 4,539,575 | A | 9/1985 | Nilsson |
| 4,576,050 | A | 3/1986 | Lambert |

(Continued)

FOREIGN PATENT DOCUMENTS

DE 19617852 1/1993

(Continued)

OTHER PUBLICATIONS

"Large-Scale Linearization Circuit For Electrostatic Motors" IBM Technical Disclosure Bulletin, US. IBM Corp. New York, vol. 37, No. 10, Oct. 1, 1994, pp. 563-564, XP000475777, ISN: 0018-8689.

(Continued)

*Primary Examiner*—John Fox
(74) *Attorney, Agent, or Firm*—Kris T. Fredrick

(57) ABSTRACT

A microvalve assembly that can help protect a microvalve or an assembly of microvalves from the environment. Such a microvalve assembly may be mechanically assembled, without the use of adhesives and/or other materials that might out-gas and/or otherwise reduce the performance of the electrostatically actuated devices contained therein. In particular, a microvalve assembly can include a base fixture, a clamp fixture that is configured to be attached to the base fixture, and an electrostatically actuated microvalve that is disposed between the base fixture and the clamp fixture. The clamp fixture may be mechanically secured to the base fixture.

10 Claims, 11 Drawing Sheets

U.S. PATENT DOCUMENTS

| | | | | |
|---|---|---|---|---|
| 4,581,624 | A | 4/1986 | O'Connor | |
| 4,651,564 | A | 3/1987 | Johnson et al. | |
| 4,654,546 | A | 3/1987 | Kirjavainen | |
| 4,722,360 | A | 2/1988 | Odajima et al. | |
| 4,756,508 | A | 7/1988 | Giachino et al. | |
| 4,821,999 | A | 4/1989 | Ohtaka | |
| 4,869,282 | A * | 9/1989 | Sittler et al. | 137/15.01 |
| 4,898,200 | A | 2/1990 | Odajima et al. | |
| 4,911,616 | A | 3/1990 | Laumann, Jr. | |
| 4,938,742 | A | 7/1990 | Smits | |
| 4,939,405 | A | 7/1990 | Okuyama et al. | |
| 5,065,978 | A | 11/1991 | Albarda et al. | |
| 5,069,419 | A | 12/1991 | Jerman | |
| 5,078,581 | A | 1/1992 | Blum et al. | |
| 5,082,242 | A | 1/1992 | Bonne et al. | |
| 5,085,562 | A | 2/1992 | van Lintel | |
| 5,096,388 | A | 3/1992 | Weinberg | |
| 5,129,794 | A | 7/1992 | Beatty | |
| 5,144,982 | A * | 9/1992 | Willbanks | 137/625.5 |
| 5,148,074 | A | 9/1992 | Fujita et al. | |
| 5,171,132 | A | 12/1992 | Miyazaki et al. | |
| 5,176,358 | A | 1/1993 | Bonne et al. | |
| 5,180,288 | A | 1/1993 | Richter et al. | |
| 5,180,623 | A | 1/1993 | Ohnstein | |
| 5,192,197 | A | 3/1993 | Culp | |
| 5,206,557 | A | 4/1993 | Bobbio | |
| 5,219,278 | A | 6/1993 | van Lintel | |
| 5,224,843 | A | 7/1993 | van Lintel | |
| 5,244,527 | A | 9/1993 | Aoyagi | |
| 5,244,537 | A | 9/1993 | Ohnstein | |
| 5,322,258 | A * | 6/1994 | Bosch et al. | 251/65 |
| 5,323,999 | A | 6/1994 | Bonne et al. | |
| 5,325,880 | A | 7/1994 | Johnson et al. | |
| 5,417,235 | A * | 5/1995 | Wise et al. | 137/1 |
| 5,441,597 | A | 8/1995 | Bonne et al. | |
| 5,452,878 | A | 9/1995 | Gravesen et al. | |
| 5,499,909 | A | 3/1996 | Yamada et al. | |
| 5,541,465 | A | 7/1996 | Higuchi et al. | |
| 5,552,654 | A | 9/1996 | Konno et al. | |
| 5,571,401 | A | 11/1996 | Lewis et al. | |
| 5,640,995 | A * | 6/1997 | Packard et al. | 137/597 |
| 5,642,015 | A | 6/1997 | Whitehead et al. | |
| 5,683,159 | A | 11/1997 | Johnson | |
| 5,725,363 | A | 3/1998 | Bustgens et al. | |
| 5,759,014 | A | 6/1998 | Van Lintel | |
| 5,759,015 | A | 6/1998 | Van Lintel et al. | |
| 5,822,170 | A | 10/1998 | Cabuz | |
| 5,836,750 | A | 11/1998 | Cabuz | |
| 5,863,708 | A | 1/1999 | Zanzucchi et al. | |
| 5,901,939 | A | 5/1999 | Cabuz et al. | |
| 5,911,872 | A | 6/1999 | Lewis et al. | |
| 5,954,079 | A | 9/1999 | Barth et al. | |
| 5,964,239 | A * | 10/1999 | Loux et al. | 137/15.21 |
| 6,087,638 | A * | 7/2000 | Silverbrook | 219/540 |
| 6,106,245 | A | 8/2000 | Cabuz | |
| 6,179,586 | B1 | 1/2001 | Herb et al. | |
| 6,182,941 | B1 | 2/2001 | Scheurenbrand et al. | |
| 6,184,607 | B1 | 2/2001 | Cabuz et al. | |
| 6,184,608 | B1 | 2/2001 | Cabuz et al. | |
| 6,211,580 | B1 | 4/2001 | Cabuz et al. | |
| 6,215,221 | B1 | 4/2001 | Cabuz et al. | |
| 6,240,944 | B1 | 6/2001 | Ohnstein et al. | |
| 6,255,758 | B1 | 7/2001 | Cabuz et al. | |
| 6,288,472 | B1 | 9/2001 | Cabuz et al. | |
| 6,358,021 | B1 | 3/2002 | Cabuz | |
| 6,432,721 | B1 | 8/2002 | Zook et al. | |
| 6,443,179 | B1 * | 9/2002 | Benavides et al. | 137/454.2 |
| 6,568,286 | B1 | 5/2003 | Cabuz | |
| 6,729,856 | B2 | 5/2004 | Cabuz et al. | |
| 6,750,589 | B2 | 6/2004 | Cabuz | |
| 6,758,107 | B2 | 7/2004 | Cabuz | |
| 6,767,190 | B2 | 7/2004 | Cabuz et al. | |
| 6,837,476 | B2 | 1/2005 | Cabuz et al. | |
| 6,866,060 | B2 * | 3/2005 | Giousouf et al. | 137/454.2 |
| 7,060,894 | B2 * | 6/2006 | Pieper et al. | 174/541 |
| 2004/0115838 | A1 | 6/2004 | Quake et al. | |

FOREIGN PATENT DOCUMENTS

| | | | |
|---|---|---|---|
| DE | 19909069 | | 9/2000 |
| DE | 10106996 | * | 9/2002 |
| EP | 0744821 | | 11/1996 |
| GB | 1223661 | | 3/1971 |
| JP | 05-219760 | | 8/1993 |
| JP | 02-86258 | | 10/1995 |
| SU | 744877 | | 6/1980 |
| WO | 9400696 | | 1/1994 |
| WO | WO 9729538 | | 8/1997 |
| WO | 0109598 | | 2/2001 |
| WO | 02070942 | | 9/2002 |
| WO | 03078874 | | 9/2003 |

OTHER PUBLICATIONS

Athavale et al., "Coupled Electrostatics-Structures-Fluidic Simulations of A Bead Mesopump," Proceedings of the International Mechanical Engineers Congress & Exhibition, Nashville, Tennessee, Oct. 1999.

B. Halg, "On a Nonvolatile Memory Cell Based on Micro-Electro-Mechanics", Proceedings of MEMS CH2832-4/90/0000-0172 IEEE (1990), pp. 172-176.

Bertz, Schubert, Werner, "Silicon Grooves With Sidewall Angles Down to 1° made By Dry Etching", pp. 331-339.

Branebjerg, Gravesen, "A New Electrostatic Actuator Providing Improved Stroke Length and Force." Micro Elctro Mechanical Systems '92 (Feb. 4-7, 1992), pp. 6-11.

Bustgens, Bacher, Menz, Schomburg, "Micropump Manufactured by Thermoplastic Molding" MEMS 1994, pp. 18-21.

C. Cabuz et al., "Factors Enhancing the Reliability of Touch-Mode Electrostatic Actuators," Sensors and Actuators 79, pp. 245-250, 2000.

C. Cabuz et al., "Mesoscopic Sampler Based on 3D Array of Electrostatically Activated Diaphragms," Proceedings of the 10th Int. Conf. On Solid-State Sensors and Actuators, Transducers'99, Jun. 7-12, 1999, Sendai Japan.

C. Cabuz et al., "The Double Diaphragm Pump," The 14th IEEE International Micro Electro Mechanical Systems conference, MEMS'01, Jan. 21-23, Interlachen, Switzerland.

C. Cabuz, et al., "High Reliability Touch-Mode Electrostatic Actuators", Technical Digest of the Solid State Sensor and Actuator Workshop, Hilton Head, S.C., Jun. 8-11, 1998, pp. 296-299.

C. Cabuz. Tradeoffs in MEMS Material (Invited Paper) Proceedings of the SPIE, vol. 2881, pp. 160-170, Austin, TX., Jul. 1996.

Cabuz, Cleopatra, "Electrical Phenomena at the Interface of Rolling-Contact, Electrostatic Actuators", Nanotribology: Critical Assessment and Research Needs, Kluwer Academic Publisher, pp. 221-236, Copyright 2003, presented at the Nanotribology Workshop, Mar. 13-15, 2000.

Cleo Cabuz, "Dielectric Related Effects in Micromachined Electrostatic Actuators," Annual Report of the IEEE/CEIDP Society, 1999, Annual Meeting, Austin, Texas, Oct. 17-20, 1999.

Jye-Shane Yang et al., "Fluorescent Porous Polymer Films as TNT Chemosensors: Electronic and Structural Effects", *J. Am. Chem. Soc.*, 1998, 120, pp. 11864-11873.

Jye-Shane Yang et al., "Porous Shape Persistent Fluorescent Polymer Films: An Approach to TNT Sensory Materials", *J. Am. Chem. Soc.*, 1998, 120, pp. 5321-5322.

Michael S. Freund et al., "A Chemically Diverse Conducting Polymer-Based 'Electronic Nose'", Proceedings of the National Academy of Sciences of the United States of America, vol. 92, No. 7, Mar. 28, 1995, pp. 2652-2656.

Minami K et al., "Fabrication of Distributed Electrostatic Micro Actuator (DEMA)" Journal of Microelectromechanical Systems, US, IEEE Inc., New York, vol. 2, No. 3, Sep. 1, 1993, pp. 121-127, XP000426532, ISSN: 1057-7157.

Porex Technologies, brochure, dated prior to Jun. 2, 2000, 4 pages.
Shikida, Sato, "Characteristics of an Electrostatically-Driven Gas Valve Under High Pressure Conditions, IEEE 1994, pp. 235-240."
Shikida, Sato, Harada, "Fabrication of An S-Shaped Microactuator," Journal of Microelectromechanical Systems, vol. 6, No. 1 (Mar. 1997), pp. 18-24.
Shikida, Sato, Tanaka, Kawamura, Fujisaki, "Electrostatically Driven Gas Valve With High Conductance", Journal of Microelectromechanical Systems, vol. 3, No. 2 (Jun. 1994), pp. 76-80.
Srinivasan et al., "Self-Assembled Fluorocarbon Films for Enhanced Stiction Reduction", TRANSDUCERS '97, 1997 International Conference on Solid-State Sensors and Actuators, Chicago, Jun. 16-19, 1997, pp. 1399-1402.
Wagner, Quenzer, Hoerscelmann, Lisec, Juerss, "Bistable Microvalve with Pneumatically Coupled Membranes," 0-7803-2985-6/96, IEEE (1996), pp. 384-388.

* cited by examiner

MICROVALVE PACKAGE ASSEMBLY

This invention was made with government support under DARPA contract number MDA972-00-C-0029. The government may have certain rights in the invention.

TECHNICAL FIELD

The invention pertains generally to microvalves and more specifically to microvalve package assemblies. In particular, the invention pertains to microvalve package assemblies that may be mechanically secured together without adhesives.

BACKGROUND

Valves such as microvalves are known. Some microvalves are electrostatically actuated. Electrostatically actuated devices such as electrostatically actuated microvalves can be quite sensitive to environmental conditions such as humidity, dust and gases. In some instances, the packages used to assemble electrostatically actuated microvalves can include adhesives that may themselves out-gas and cause stiction within the electrostatically actuated microvalve.

Therefore, a need remains for a microvalve assembly that protects a microvalve or an assembly of microvalves from exterior environmental conditions. A need also remains for a microvalve assembly that is free of adhesives and/or other materials that might out-gas and/or otherwise reduce the performance of the electrostatically actuated devices contained therein.

SUMMARY

The invention provides a microvalve assembly that protects a microvalve or an assembly of microvalves from the environment. Moreover, the invention provides a microvalve assembly that is mechanically assembled, without the use of adhesives and/or other materials that might out-gas and/or otherwise reduce the performance of the electrostatically actuated devices contained therein.

Accordingly, an illustrative embodiment of the present invention pertains to a microvalve assembly that includes a base fixture, a clamp fixture, and an electrostatically actuated microvalve that is disposed between the base fixture and the clamp fixture. The clamp fixture is mechanically secured to the base fixture without an adhesive.

In some instances, the base fixture may include a recessed clamp fixture receiving region that is complementary in size and shape to the clamp fixture such that the clamp fixture fits at least substantially into the recessed clamp fixture receiving region. The recessed clamp fixture may include a recessed microvalve receiving region while the clamp fixture may include a raised microvalve receiving region that is configured to at least substantially align with the recessed microvalve receiving region of the base fixture.

The raised microvalve receiving region of the clamp fixture can include a gasket receiving recess. A gasket may be disposed within the gasket receiving recess. In some instances, the gasket may assist in securing the electrostatically actuated microvalve within the microvalve assembly, as well as helping to provide a seal. The electrostatically actuated microvalve may include a valve aperture member layer with a valve aperture and a valve flap member that includes a flap that can selectively overly the valve aperture to provide a valve action. In some instances, the base fixture may include an inlet that is in fluid communication with the valve aperture.

In some instances, the raised microvalve receiving region can define at least in part a fluid receiving volume. The clamp fixture may include an outlet that is in fluid communication with the fluid receiving volume.

In some cases, the clamp fixture may also include one or more clamp fixture securement apertures and the base fixture may also include one or more base fixture securement apertures that are at least substantially aligned with the one or more clamp fixture securement apertures. A securement device may be positioned within the clamp fixture securement aperture and the base fixture securement aperture in order to secure the clamp fixture to the base fixture. In some instances, the securement device secures the clamp fixture to the base fixture without the use of adhesives that may otherwise out-gas or otherwise interfere with operation of the electrostatically actuated microvalve.

In some cases, the base fixture securement aperture may include a threaded recess, and the securement device may be a threaded securement that is disposed through the clamp fixture securement aperture and that is threadedly engaged with the threaded recess to secure the clamp fixture to the base fixture. In some instances, the securement device may be a rod that is friction fit within the base fixture securement aperture and the clamp fixture securement aperture.

The above summary of the present invention is not intended to describe each disclosed embodiment or every implementation of the present invention. The Figures, Detailed Description and Examples which follow more particularly exemplify these embodiments.

BRIEF DESCRIPTION OF THE FIGURES

The invention may be more completely understood in consideration of the following detailed description of various embodiments of the invention in connection with the accompanying drawings, in which.

Figure 1:
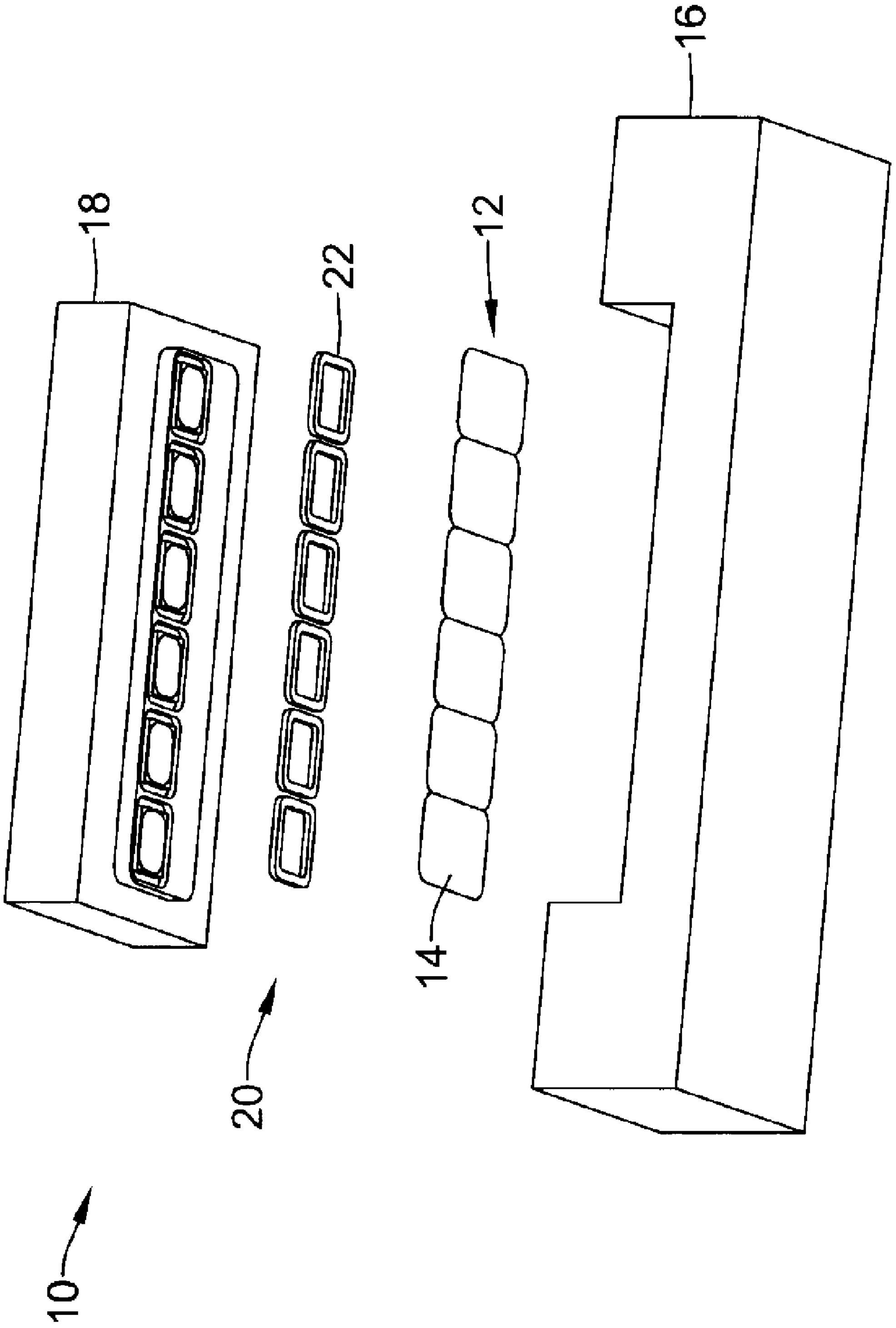
FIG. 1 is an exploded perspective illustration of a microvalve assembly in accordance with an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

The invention pertains generally to microvalve packaging assemblies such as might be employed with electrostatically actuated microvalves. In particular, FIG. 1 is an exploded perspective view of a microvalve assembly 10 including an array 12 of electrostatically actuated microvalves 14. While shown generically in FIG. 1, each electrostatically actuated microvalve 14 may include several layers that are configured to provide a selectively openable valve aperture. In some embodiments, as illustrated, a total of six electrostatically actuated microvalves may be arranged in array 12. In other embodiments, a greater number or a lesser number of electrostatically actuated microvalves may be used, as necessitated by any particular application.

Figure 10:
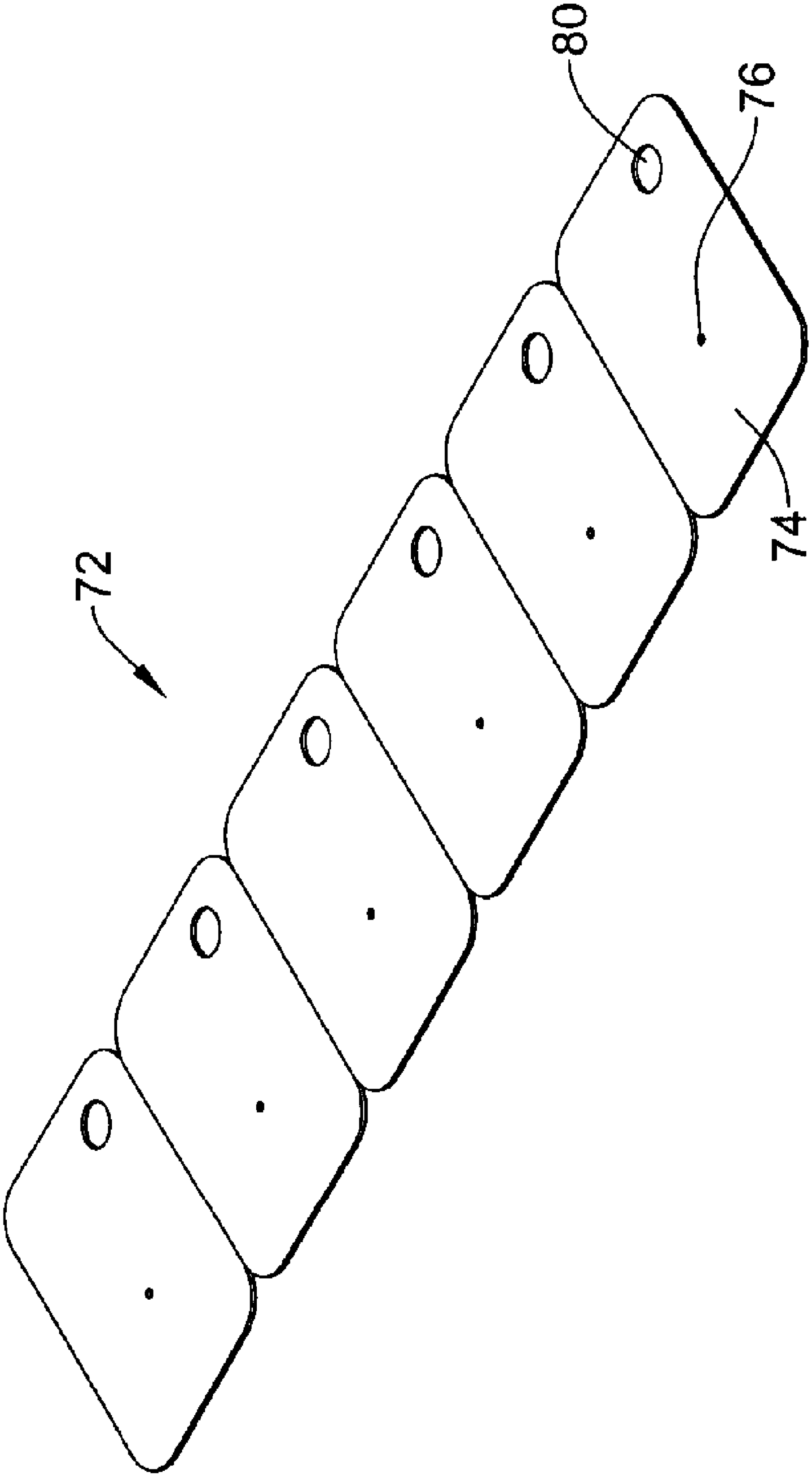
FIG. 10 is a perspective view of a microvalve bottom layer assembly as shown in FIG. 1.
Figure 11:
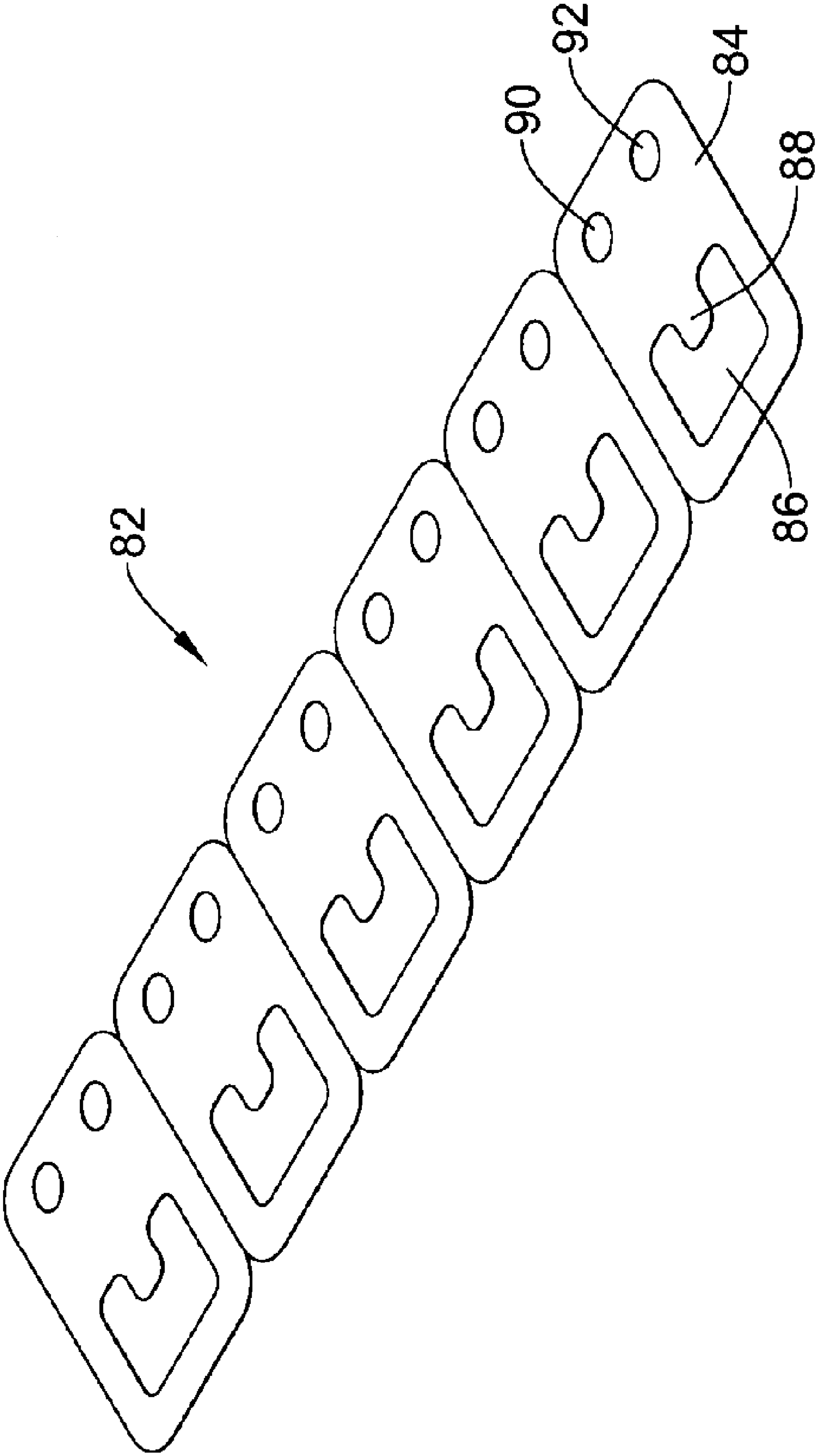
FIG. 11 is a perspective view of a microvalve valve layer assembly as shown in FIG. 1.

Array 12 of electrostatically operated microvalves may include any particular type or configuration of electrostatically operated microvalve. An example of an electrostatically actuated microvalve 14 is shown in FIGS. 10 and 11, which are discussed in greater detail hereinafter.

Array 12 of electrostatically operated microvalves 14 is positioned between a base fixture 16 and a clamp fixture 18. In the illustrated embodiment, an array 20 of gaskets 22 are deployed between array 12 of electrostatically operated microvalves 14 and clamp fixture 18. As can be seen in FIG. 1, array 20 of gaskets 22 interacts with clamp fixture 18 and array 12 of electrostatically actuated microvalves 14 to help secure array 12 of electrostatically actuated microvalves 14. The design and construction of base fixture 16 is described in greater detail with respect to FIGS. 2-4. The design and construction of clamp fixture 18 is described in greater detail with respect to FIGS. 5 and 7-9.

Figure 2:
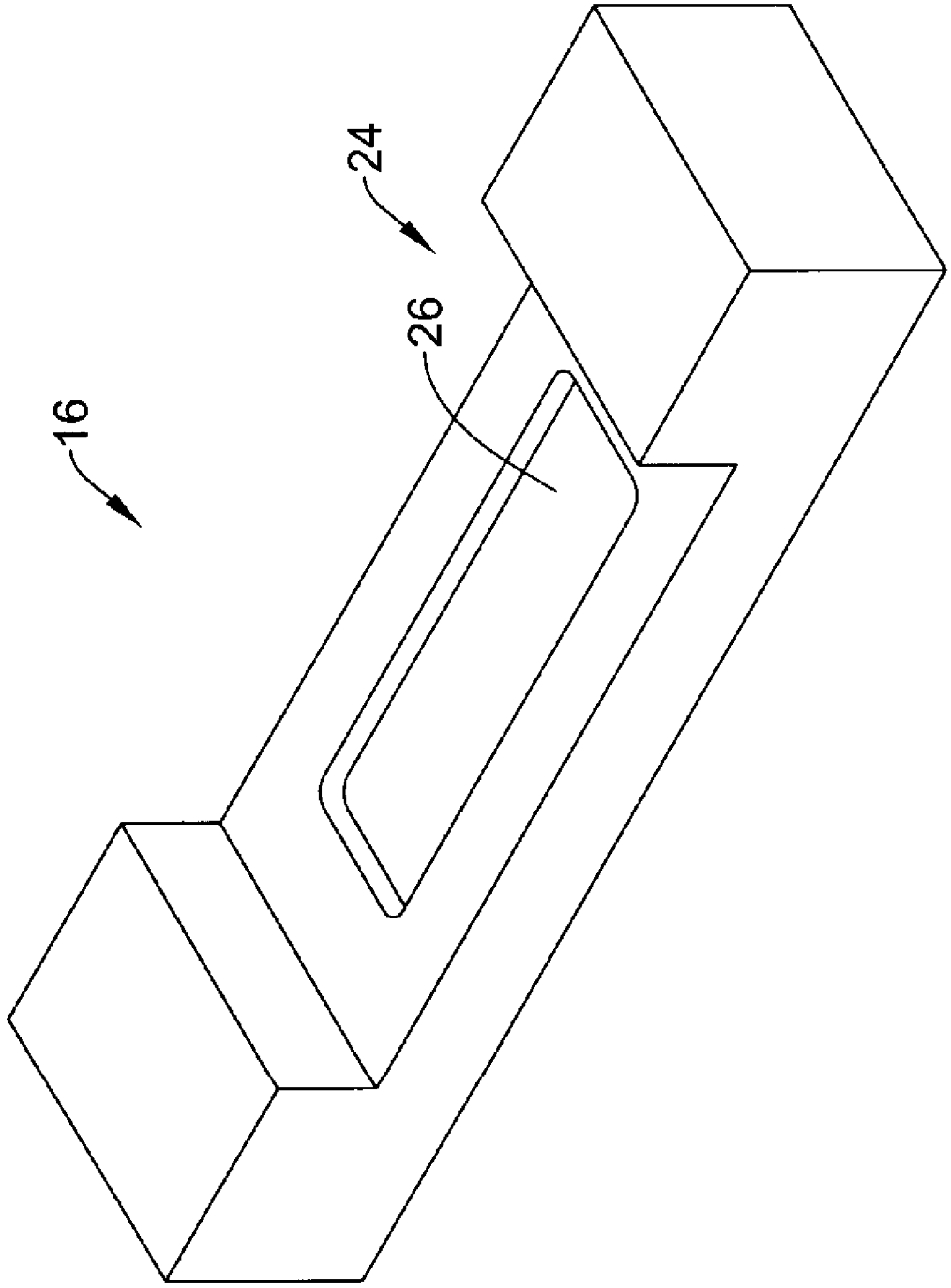
FIG. 2 is a perspective view of the base fixture shown in FIG. 1.
Figure 3:
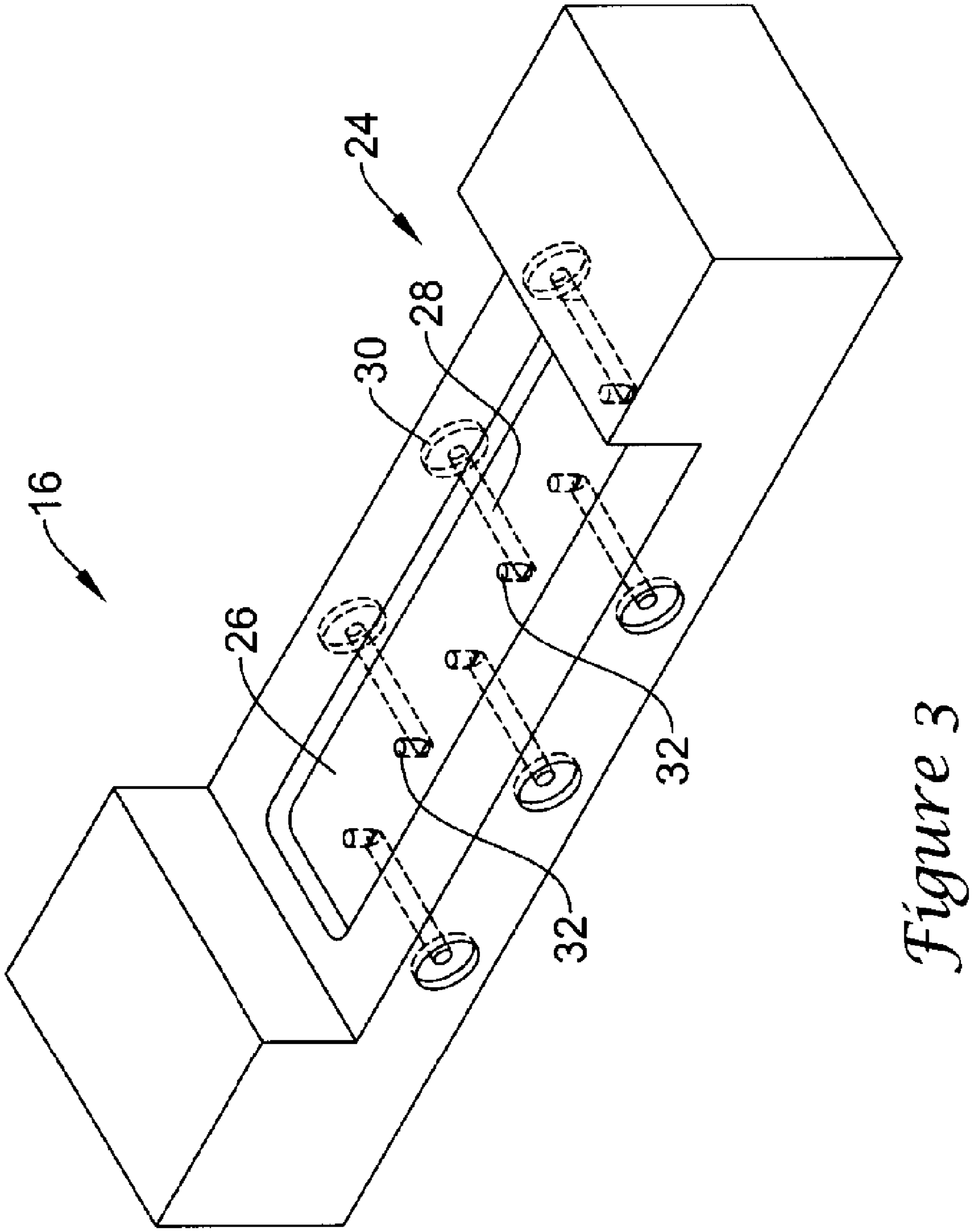
FIG. 3 is a partially phantom perspective view of the base fixture of FIG. 1, illustrating internal fluid passageways.
Figure 4:
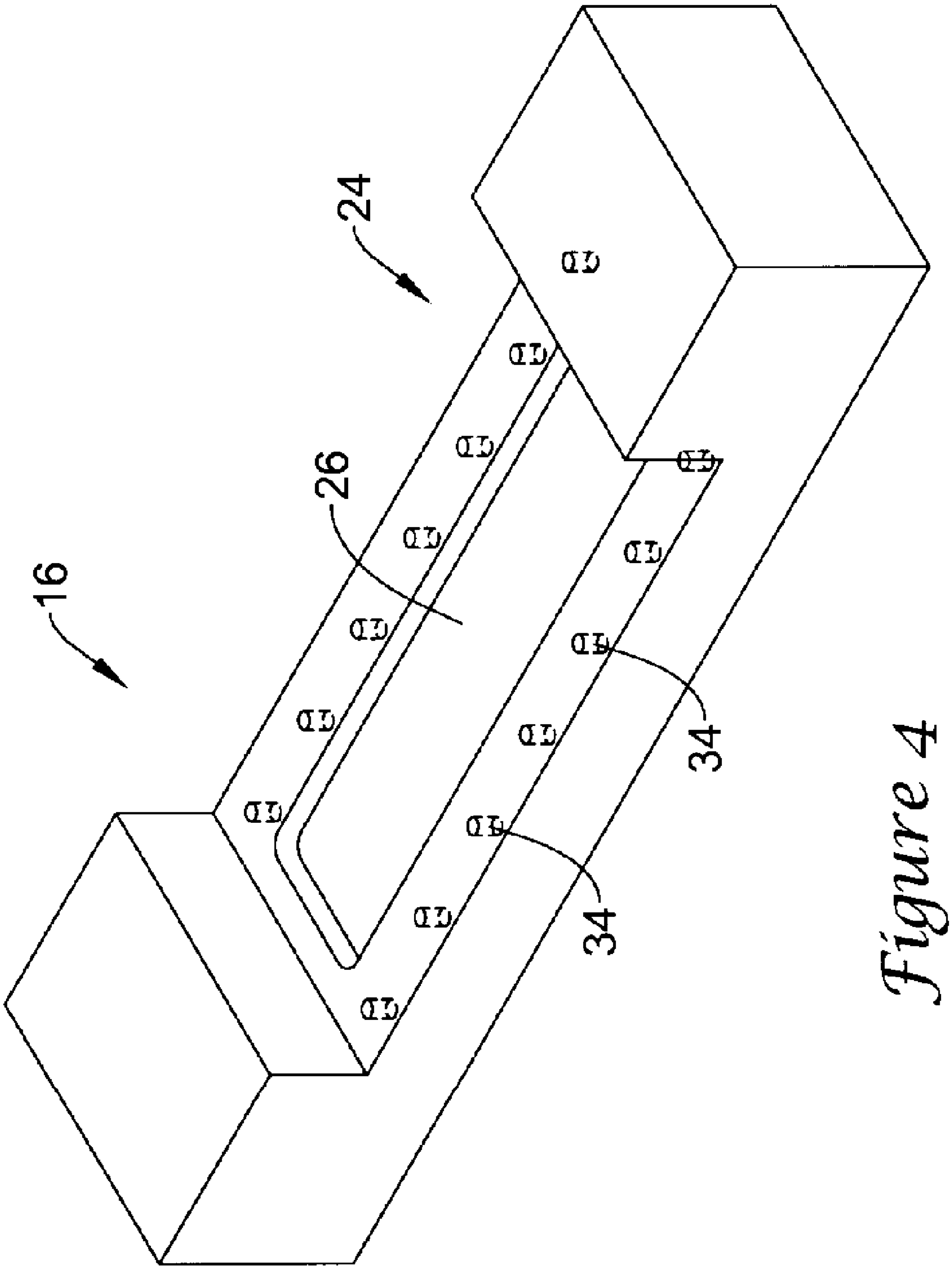
FIG. 4 is a partially phantom perspective view of the base fixture of FIG. 1, illustrating assembly passageways.

FIGS. 2 through 4 are renditions of base fixture 16, each illustrating particular aspects of the internal and external structure of base fixture 16. In particular, FIG. 2 is a perspective illustration of the external structure of base fixture 16. While base fixture 16 may take any appropriate size and geometric shape depending on intended use, in some embodiments, as illustrated, base fixture 16 may assume the shape of a rectangular block.

Base fixture 16 may, as illustrated, include a recessed clamp fixture receiving region 24 that is complementary in size and shape to clamp fixture 18 such that clamp fixture 18 may fit at least substantially into recessed clamp fixture receiving region 24. In some instances, recessed clamp fixture receiving region 24 may be configured such that clamp fixture 18 completely fits into recessed clamp fixture receiving region 24.

In some instances, recessed clamp fixture receiving region 24 may itself include a recessed electrostatically actuated microvalve receiving region 26, which may be configured to at least partially accept array 12 of electrostatically actuated microvalves 14 (FIG. 1).

Base fixture 16 may be formed of any suitable material and using any suitable technique. In some instances, base fixture 16 can be formed by grinding or abrading away material from a rectangular block of any suitable polymeric material such as an acrylic plastic. In some cases, base fixture 16 may be molded into the configuration shown, for example, in FIG. 2.

FIG. 3 is a partially phantom perspective view of base fixture 16, illustrating for example the internal fluid passageways of base fixture 16. In particular, base fixture 16 can be seen as including a total of six internal fluid passageways 28. Each internal fluid passageway 28 extends from an external fluid port 30 to an internal fluid port 32 that, in some instances, may correspond to a valve aperture present within electrostatically actuated microvalve 14 (FIG. 1). Internal fluid ports 32 may be positioned such that they contact a bottom surface 32 of recessed electrostatically actuated microvalve receiving region 26. Each external fluid port 30 may be configured to permit tubing or other external fluid passageways to be secured to external fluid port 30.

Each internal fluid passageway 28 may be sized to accommodate the particular fluid expected during use. The term "fluid" as used herein can include gases, liquids or combinations of gases and liquids. Internal fluid passageways 28 may be formed using any suitable technique. In some instances, internal fluid passageways 28 may be formed by mechanically drilling into base fixture 16.

In the illustrated embodiment, external fluid ports 30 are located on either side of base fixture 16. If it is desired to accommodate a greater number of electrostatically actuated microvalves 14 (FIG. 1), perhaps by arranging the electrostatically actuated microvalves 14 in a two-dimensional array, then external fluid ports 30 can instead be positioned on the bottom surface of base fixture 16, if desired. Appropriate changes to internal fluid passageways 28 would of course need to be made to accommodate this variation.

FIG. 4 is a partially phantom perspective view of base fixture 16, illustrating for example the assembly passageways of base fixture 16. In particular, base fixture 16 includes a number of base fixture securement apertures 34. In the illustrated embodiment, a total of seven base fixture securement apertures 34 are positioned along either side of base fixture 16. Base fixture securement apertures 34 may be positioned within recessed clamp fixture receiving region 24 and outside of recessed electrostatically actuated microvalve receiving region 26. In some instances, at least a portion of base fixture securement apertures 34 may be threaded in order to securely accept a threaded securement such as a screw or a bolt (not illustrated).

Figure 5:
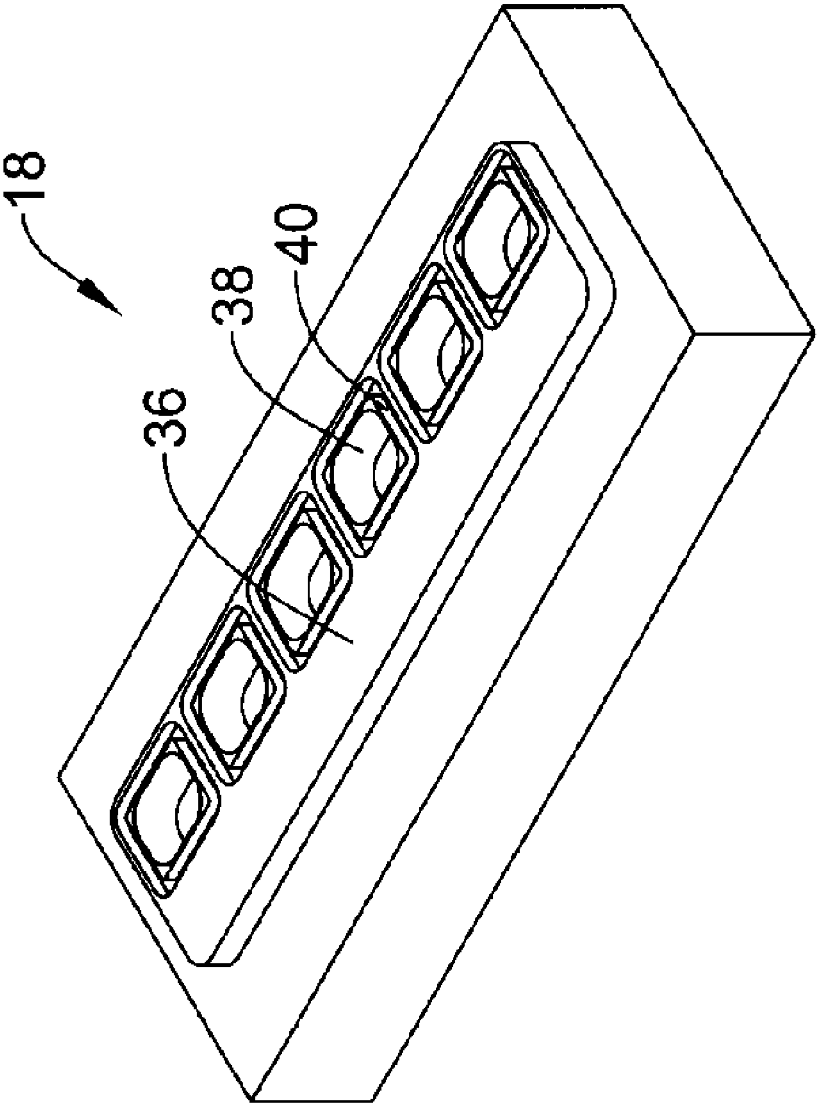
FIG. 5 is a perspective view of the clamp fixture shown in FIG. 1.

FIGS. 5 and 7 through 9 are renditions of clamp fixture 18, each illustrating particular aspects of the internal and external structure of clamp fixture 18. In particular, FIG. 5 is a perspective illustration of the external structure of clamp fixture 18. While clamp fixture 18 may take any appropriate size and geometric shape depending on intended use, in some embodiments, as illustrated, clamp fixture 18 may assume the shape of a rectangular block. In some instances, clamp fixture 18 may include a raised electrostatically actuated microvalve receiving region 36, which may be configured to at least partially accept array 12 of electrostatically actuated microvalves 14 (FIG. 1).

Clamp fixture 18 may be formed of any suitable material and using any suitable technique. In some instances, clamp fixture 18 can be formed by grinding or abrading away material from a rectangular block of any suitable polymeric material such as an acrylic plastic. In some cases, clamp fixture 18 may be molded into the configuration shown for example in FIG. 5.

As seen for example in FIG. 5, raised electrostatically actuated microvalve receiving region 36 may include one or several cavities 38 defining fluid volumes that can be used in conjunction with electrostatically actuated microvalves 14 (FIG. 1). In the illustrated embodiment, raised electrostatically actuated microvalve receiving region 36 includes a total of six cavities 38 arranged in a linear array. A greater or lesser number of cavities 38 may be employed, arranged in any suitable manner, depending on intended use.

FIG. 5 also shows several gasket receiving recesses 40. In the illustrated embodiment, raised electrostatically actuated microvalve receiving region 36 includes a total of six gasket receiving regions 40 arranged in a linear array. A greater or lesser number of gasket receiving regions 40 may be employed, arranged in any suitable manner, depending on intended use. In a particular embodiment, each gasket receiving region 40 is disposed about a corresponding cavity 38.

Figure 6:
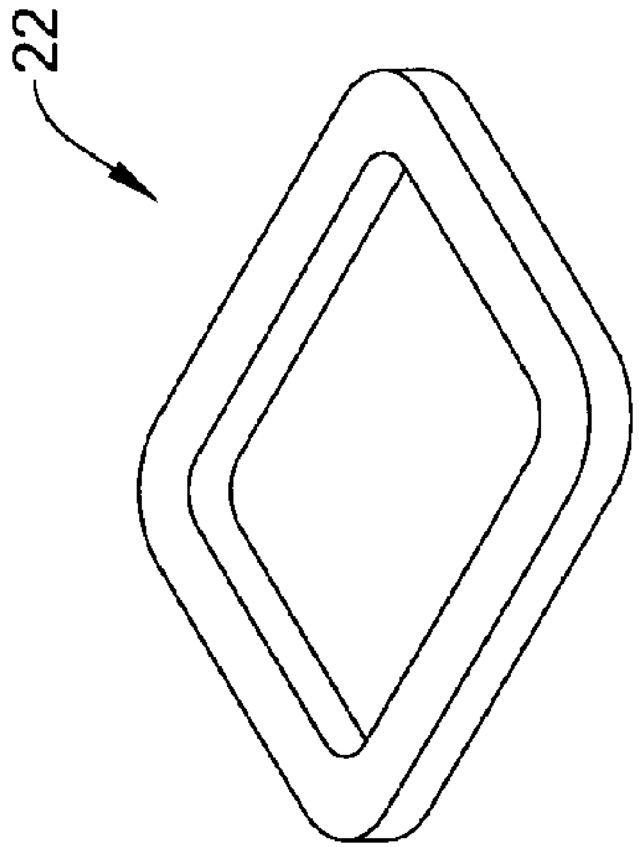
FIG. 6 is a perspective view of a gasket as shown in FIG. 1.

FIG. 6 is an enlarged perspective view of one of the gaskets 22. Gasket 22 may be sized and configured to fit at least partially into gasket receiving region 40 (FIG. 5). It can be seen that, in some embodiments, gasket 22 may serve to provide a seal around cavity 38 (FIG. 5). When clamp fixture 18 (FIG. 1) is secured in position within recessed clamp fixture receiving region 26 (FIG. 2) of base fixture 16 (FIG. 1), gasket 22 may also aid in holding electrostatically actuated microvalve 14 (FIG. 1) securely in place. In particular embodiments, array 20 (FIG. 1) of gaskets 22 may hold array 12 (FIG. 1) of electrostatically actuated microvalves 14 securely in place without requiring adhesives or other similar chemicals that may out-gas.

Figure 7:
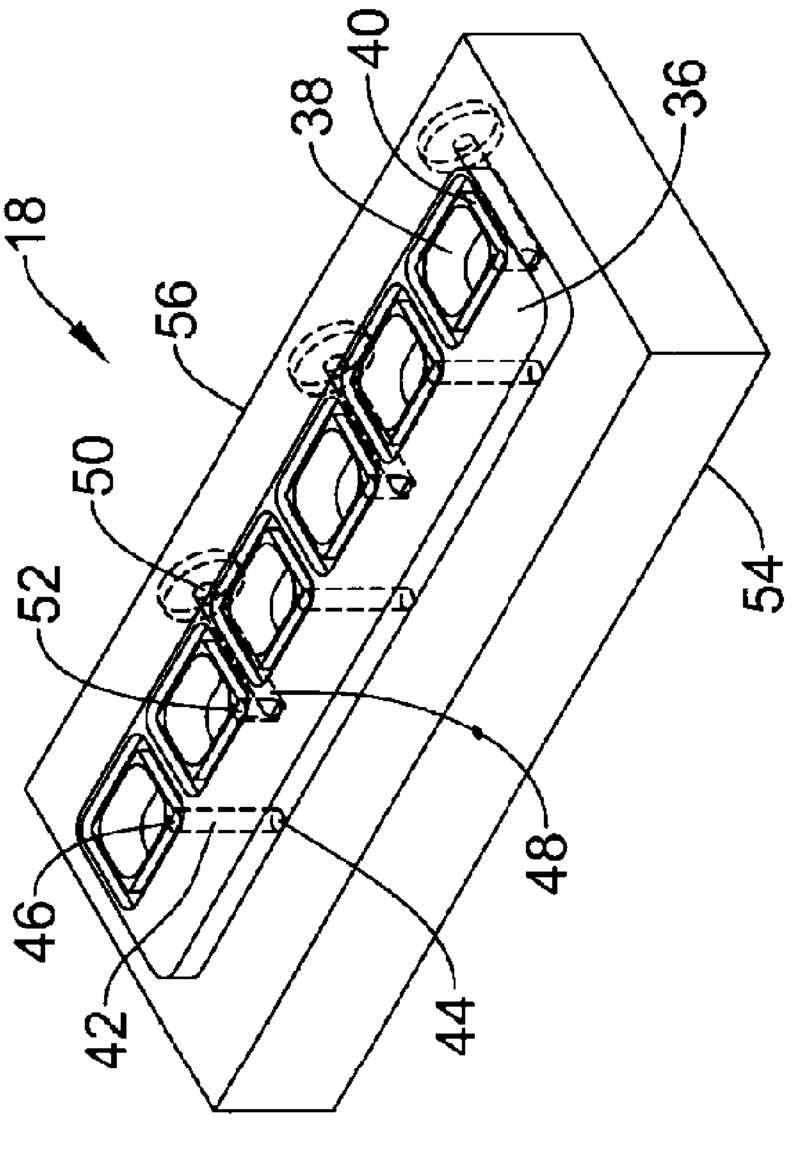
FIG. 7 is a partially phantom perspective view of the clamp fixture of FIG. 1, illustrating internal fluid passageways.

FIG. 7 is a partially phantom perspective view of clamp fixture 18, illustrating for example the internal fluid passageways of clamp fixture 18. In particular, clamp fixture 18 can be seen as including a total of three internal fluid passageways 42 and three internal fluid passageways 48.

Each internal fluid passageway 42 extends from an external fluid port 44 to an internal fluid port 46 that is fluid communication with cavity 38. Each internal fluid passageway 48 extends from an external fluid port 50 to an internal fluid port 52 that is fluid communication with cavity 38. Each external fluid port 50 may be configured to permit tubing or other external fluid passageways to be secured to external fluid port 50.

Each internal fluid passageway 42 and 48 may be sized to accommodate the particular fluid expected during use. Internal fluid passageways 42 and 48 may be formed using any suitable technique. In some instances, internal fluid passageways 42 and 48 may be formed by mechanically drilling into clamp fixture 18.

In the illustrated embodiment, external fluid ports 44 are located on a top surface 54 of clamp fixture 18 while external fluid ports 50 are located along a side 56 of clamp fixture 18. With reference to top surface 54, it should be noted that clamp fixture 18 is, for illustrative purposes, oriented upside-down from its position secured to base fixture 16 (see FIG. 1).

If it is desired to accommodate a greater number of electrostatically actuated microvalves 14 (FIG. 1), perhaps by arranging the electrostatically actuated microvalves 14 in a two-dimensional array, then external fluid ports 50 can instead be positioned on the top surface 54 of clamp fixture 18. Appropriate changes to internal fluid passageways 48 would of course need to be made to accommodate this variation.

Figure 8:
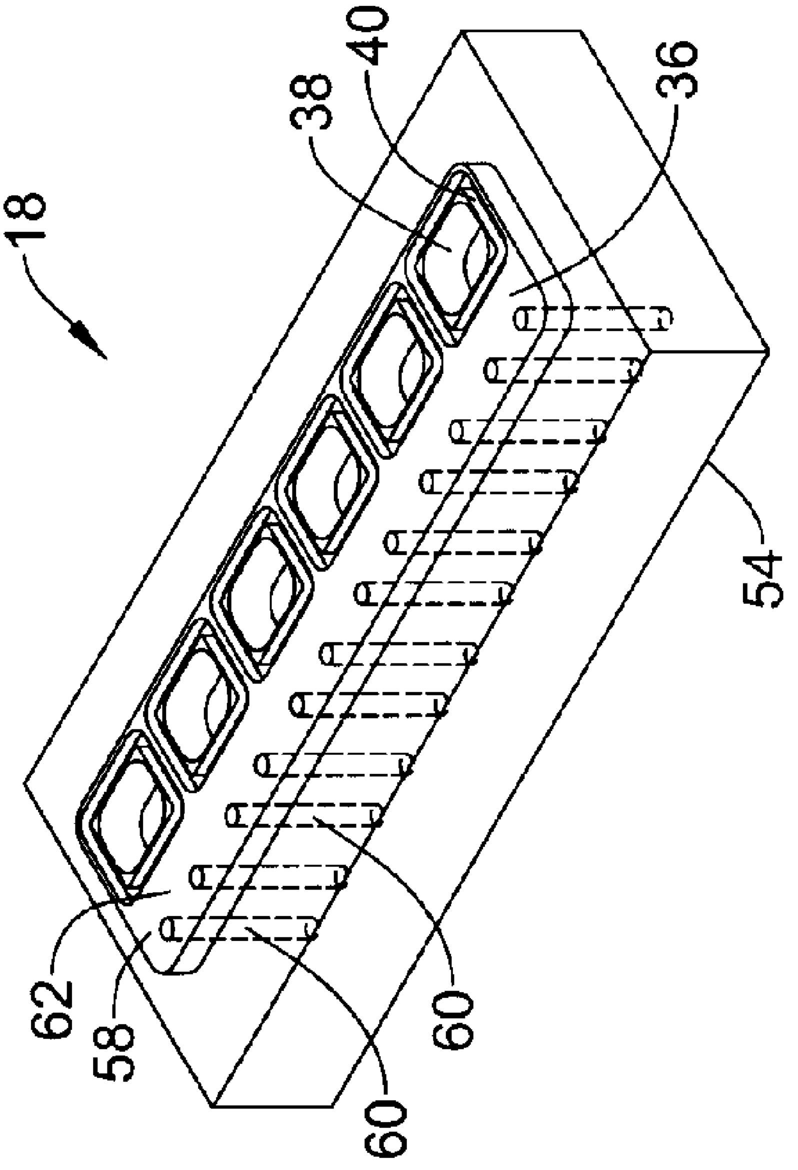
FIG. 8 is a partially phantom perspective view of the clamp fixture of FIG. 1, illustrating internal passageways intended for electrical conduction.

FIG. 8 is a partially phantom perspective view of clamp fixture 18, illustrating for example internal conductive passageways intended for electrical conduction through clamp fixture 18. In particular, clamp fixture 18 includes several conducting apertures 60 that each extend from top surface 54 to a bottom surface 62 of raised electrostatically actuated microvalve receiving region 36.

While in some instances an internal surface of conducting aperture 60 may itself be electrically conductive, it is considered rather that conducting aperture 60 is configured to accommodate an electrically conductive member (not illustrated). Any suitable conductive material may be used in forming an electrically conductive member. In some cases, rubber that has been doped or otherwise modified to carry an electrical current may be used.

In some instances, a pair of conducting apertures 60 are arranged in alignment with each cavity 38 and can be used to transmit electrical signals to an electrostatically actuated microvalve 14 (FIG. 1) disposed on raised electrostatically actuated microvalve receiving region 36. In particular, a first pair of conducting apertures 60 may be aligned with a first cavity 38 (and hence a first electrostatically actuated microvalve 14 (FIG. 1), a second pair of conducting apertures 60 may be aligned with a second cavity 38 (and hence a second electrostatically actuated microvalve 14), and so on. Conducting apertures 60 may have any suitable dimension and may be formed using any suitable technique. In some embodiments, conductive apertures 60 may be formed by drilling into clamp fixture 18.

Figure 9:
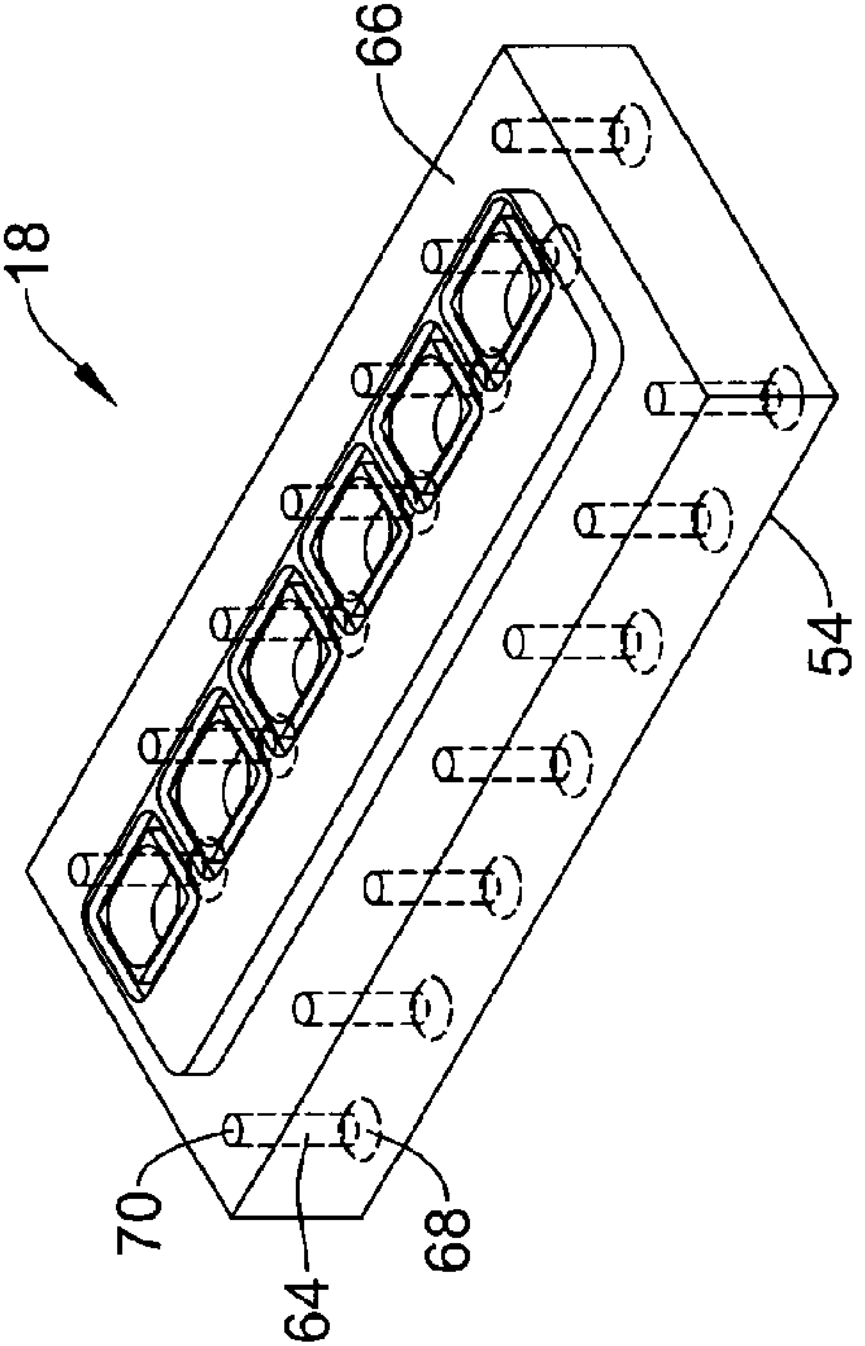
FIG. 9 is a partially phantom perspective view of the clamp fixture of FIG. 1, illustrating assembly passageways.

FIG. 9 is a partially phantom perspective view of clamp fixture 18, illustrating for example assembly passageways of clamp fixture 18. In particular, clamp fixture 18 includes a number of clamp fixture securement apertures 64 extending from top surface 54 to a bottom surface 66 of clamp fixture 18. In the illustrated embodiment, each assembly passageway 64 includes a widened portion 68 proximate top surface 54 that is configured to accept the top of a threaded securement such as a screw or a bolt (not illustrated).

Unlike base fixture securement apertures 34 (FIG. 4), which may extend only partially through base fixture 16, each clamp fixture securement aperture 68 extends to a bottom end 70 that is in communication with bottom surface 66 of clamp fixture 18. When clamp fixture 18 is positioned within recessed clamp fixture receiving region 24 (FIG. 2), each clamp fixture securement aperture 68 may align vertically with a corresponding base fixture securement aperture 34. As a result, clamp fixture 18 may be secured to base fixture 16 and within recessed clamp fixture receiving region 24 by providing appropriate securements through each clamp fixture securement aperture 68 and into the corresponding base fixture securement aperture 34.

In some instances, securements such as threaded securements may be used. Suitable threaded securements include bolts and screws. In other cases, frictionally secured securements may be employed. In the illustrated embodiment, a total of seven clamp fixture securement apertures 68 are positioned along either side of clamp fixture 18.

In FIG. 1, array 12 of electrostatically actuated microvalves 14 is shown schematically, in order to show how array 12 fits between base fixture 16 and clamp fixture 18 and how array 12 is in fact secured therebetween. An illustrative electrostatically actuated microvalve 14 has two distinct layers or members. FIGS. 10 and 11 illustrate, respectively, an illustrative valve aperture layer or member and a valve flap layer or member, respectively.

FIG. 10 shows an array 72 of valve aperture members 74. Each valve aperture member 74 includes a valve aperture 76. In some embodiments, valve aperture 76 may be in fluid communication with internal fluid port 32 (FIG. 3) positioned within base fixture 16 (FIG. 3). Each valve aperture member 74 also includes an electrical aperture 80.

Electrical aperture 80 can be used to provide electrical communication to an electrode or electrodes (not illustrated) present within valve aperture member 74. Electrical aperture 80 may be in electrical communication through a conductive member (not seen) extending through conducting aperture 60 (FIG. 8).

FIG. 11 shows an array 82 of valve flap members 84. Each valve flap member 84 includes a void 86 that corresponds in some instances to the location of a respective cavity 38 (FIG. 5) and thus the void 85 overlays cavity 38. Extending into void 86 is a valve flap 88. When array 82 of valve flap members 84 is disposed over array 72 of valve aperture members 74 (FIG. 10), each valve flap 88 extends over the corresponding valve aperture 76 (FIG. 10).

Each valve flap 88 includes an electrode (not illustrated) that can cause, upon application of an appropriate voltage, each valve flap 88 to move either towards or away from valve aperture 76 (FIG. 10). As such, each valve flap member 84 may include a first electrical aperture 90 and a second electrical aperture 92. In some cases, first electrical aperture 90 provides electrical communication with the electrode present within valve flap 88 while second electrical aperture 92 represents an aperture through which electrical contact can be made with electrical aperture 80 (FIG. 10).

In particular embodiments, first electrical aperture 90 may provide access for an electrical connection with an electrode present within valve flap 88 and may be powered by a conductive member (not seen) extending through conducting aperture 60 (FIG. 8). Second electrical aperture 92 may be an aperture through which a conductive member (not seen) extending through conducting aperture 60 (FIG. 8) may be in electrical contact with electrical aperture 80 (FIG. 10). In some embodiments, electrical communication or contact with the electrode present within valve aperture member 74 (FIG. 10) and the electrode present within valve flap 88 (FIG. 11) may be established after array 72 of valve aperture members 74 and array 82 of valve flap members 84 have been secured between base fixture 16 (FIG. 1) and clamp fixture 18 (FIG. 1).

Gaskets 22 (FIG. 1) may be disposed over array 82 of valve flap members 84 or, alternatively, gaskets 22 may be inserted into gasket receiving recesses 40 (FIG. 5), and clamp fixture 18 (FIG. 1) may be disposed within recessed clamp fixture receiving region 26 (FIG. 2) of base fixture 16. Clamp fixture 18 may be secured to base fixture 16 using securements extending through each clamp fixture securement aperture 68 (FIG. 9) and into each corresponding base fixture securement aperture 34 (FIG. 4).

Once the assembly has been completed as such, electrical communication or contact with the electrode present within valve aperture member 74 (FIG. 10) and the electrode present within valve flap 88 (FIG. 11) may be established by inserting conductive members such as conductive rubber plugs through each conducting aperture 60 (FIG. 8).

In some embodiments, a first conductive rubber plug may be inserted through a conducting aperture 60 (FIG. 8) such that it contacts or passes into electrical aperture 90 (FIG. 11) and thus provides electrical communication with an electrode present (not illustrated) present within valve flap 88 (FIG. 11). A second conductive rubber plug may be inserted through an adjacent conducting aperture 60 such that it passes through electrical aperture 92 (FIG. 11 ) and contacts or passes into electrical aperture 80 (FIG. 10) and provides electrical communication with an electrode present (not illustrated) within valve aperture member 74 (FIG. 10).

The invention should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

What is claimed is:

1. A microvalve assembly, comprising:

a base fixture including a recessed clamp fixture receiving region-wherein the recessed clamp fixture receiving region comprises a recessed microvalve receiving region;

a clamp fixture, wherein the recessed clamp fixture receiving region is complementary in size and shape to the clamp fixture, such that the clamp fixture fits at least substantially into the recessed clamp fixture receiving region;

an electrostatically activated microvalve disposed between the base fixture and the clamp fixture; and wherein the clamp fixture is mechanically secured to the base fixture without an adhesive.

2. The microvalve assembly of claim 1, wherein the clamp fixture comprises a raised microvalve receiving region that, when the clamp fixture is positioned into the base fixture, the raised microvalve receiving region at least substantially aligns with the recessed microvalve receiving region.

3. The microvalve assembly of claim 2, wherein the raised microvalve receiving region comprises a gasket receiving recess.

4. The microvalve assembly of claim 3, further comprising a gasket disposed at least partially within the gasket receiving recess.

5. The microvalve assembly of claim 2, wherein the raised microwave receiving region defines a fluid receiving volume.

6. The microvalve assembly of claim 5, wherein the clamp fixture further comprises an outlet in fluid communication with the fluid receiving volume.

7. A microvalve assembly, comprising:

a base fixture comprising a recessed clamp fixture receiving region and a recessed microvalve receiving region disposed within the recessed clamp fixture receiving region;

a clamp fixture configured to fit at least substantially into the recessed clamp receiving region of the base fixture, the clamp fixture comprising a raised microvalve receiving region at least substantially aligned with the recessed microvalve receiving region of the base fixture; and an array of electrostatically activated microvalves disposed between the base fixture and the clamp fixture;

wherein the clamp fixture is mechanically secured to the base fixture without adhesives.

8. The microvalve assembly of claim 7, wherein the raised microvalve receiving region comprises a plurality of gasket receiving recesses.

9. The microvalve assembly of claim 8, further comprising a plurality of gaskets disposed at least partially within the plurality of gasket receiving recesses.

10. The microvalve assembly of claim 7, further comprising a plurality of inputs and a plurality of outputs, each of the plurality of inputs and each of the plurality of outputs in fluid communication with one of the plurality of electrostatically actuated microvalves.

* * * * *